United States Patent
Zhang et al.

(10) Patent No.: US 11,124,628 B2
(45) Date of Patent: Sep. 21, 2021

(54) METHOD OF ATTENUATING CONCERNTRATION OF ACROLEIN

(71) Applicant: Dow Global Technologies LLC, Midland, MI (US)

(72) Inventors: Kainan Zhang, Shanghai (CN); Yabin Sun, Shanghai (CN); Jeffrey M. Cogen, Flemington, NJ (US); Timothy J. Person, Pottstown, PA (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 79 days.

(21) Appl. No.: 16/326,235

(22) PCT Filed: Aug. 30, 2016

(86) PCT No.: PCT/CN2016/097260
§ 371 (c)(1),
(2) Date: Feb. 18, 2019

(87) PCT Pub. No.: WO2018/039896
PCT Pub. Date: Mar. 8, 2018

(65) Prior Publication Data
US 2019/0211185 A1    Jul. 11, 2019

(51) Int. Cl.
| | |
|---|---|
| *C08K 5/3492* | (2006.01) |
| *C08K 5/34* | (2006.01) |
| *C08K 5/18* | (2006.01) |
| *C08K 5/17* | (2006.01) |
| *C08K 5/14* | (2006.01) |
| *C08K 5/20* | (2006.01) |
| *C08K 5/31* | (2006.01) |
| *C08L 23/08* | (2006.01) |

(52) U.S. Cl.
CPC ............ *C08K 5/34922* (2013.01); *C08K 5/14* (2013.01); *C08K 5/17* (2013.01); *C08K 5/18* (2013.01); *C08K 5/20* (2013.01); *C08K 5/31* (2013.01); *C08K 5/34* (2013.01); *C08K 5/34924* (2013.01); *C08L 23/08* (2013.01); *C08L 2312/00* (2013.01)

(58) Field of Classification Search
CPC ... C08K 5/14; C08K 5/17; C08K 5/18; C08K 5/20; C08K 5/31; C08K 5/34; C08K 5/34922; C08K 5/34924; C08L 23/08; C08L 2312/00
See application file for complete search history.

(56) References Cited

U.S. PATENT DOCUMENTS

| | | | |
|---|---|---|---|
| 3,923,678 A | 12/1975 | Kleiner et al. | |
| 4,857,600 A | 8/1989 | Gross et al. | |
| 5,367,025 A * | 11/1994 | Needham | C08L 23/04 524/513 |
| 5,575,965 A | 11/1996 | Caronia et al. | |
| 5,760,283 A | 6/1998 | Roof et al. | |
| 6,496,629 B2 | 12/2002 | Ma et al. | |
| 6,714,707 B2 | 3/2004 | Rossi et al. | |
| 2004/0068093 A1* | 4/2004 | Merrigan | A61L 15/60 528/490 |
| 2004/0267054 A1 | 12/2004 | Ward et al. | |
| 2006/0160848 A1 | 7/2006 | Burcham et al. | |
| 2011/0306786 A1 | 12/2011 | Perret et al. | |
| 2013/0053520 A1 | 2/2013 | Yamaura et al. | |
| 2015/0203701 A1 | 7/2015 | Sun et al. | |
| 2018/0105489 A1 | 4/2018 | Shinohata | |

FOREIGN PATENT DOCUMENTS

| | | |
|---|---|---|
| DE | 2520814 | 11/1976 |
| JP | 58001108 B2 | 1/1983 |
| JP | 61002056 B2 | 1/1986 |
| JP | 10231396 | 9/1998 |
| KR | 2010013741 | 2/2010 |
| KR | 1117296 B1 | 3/2012 |
| WO | 1999043666 | 9/1999 |
| WO | 0058393 | 10/2000 |
| WO | 0102305 | 1/2001 |
| WO | 03080702 | 10/2003 |
| WO | 20060339717 | 10/2003 |
| WO | 2004003024 | 1/2004 |
| WO | 2006002473 | 1/2006 |
| WO | 2010076515 | 7/2010 |
| WO | 2011004138 | 1/2011 |
| WO | 2011130907 | 10/2011 |
| WO | 2012046734 | 4/2012 |
| WO | 2012082679 | 6/2012 |
| WO | 2014040532 | 3/2014 |
| WO | 2014179070 | 11/2014 |
| WO | 2014205358 | 12/2014 |
| WO | 2015071065 | 5/2015 |
| WO | 2015149634 | 10/2015 |
| WO | 2018039896 | 3/2018 |

OTHER PUBLICATIONS

Hamann, Kristin, et. al., "Acrolein scavenging: a potential novel mechanism of attenuating oxidative stress following spinal cord injury," Journal of Neurochemistry, 2009, p. 1348-1356, v. 111.

Zhu, Qin, et. al., "Trapping Effects of Green and Black Tea Extracts on Peroxidation-Derived Carbonyl Substances of Seal Blubber Oil," Journal of Agricultural and Food Chemistry, 2009, p. 1065-1069, v. 57.

* cited by examiner

*Primary Examiner* — Patrick D Niland

(57) ABSTRACT

Disclosed are a method of attenuating concentration of acrolein, materials and manufactured articles prepared by the method. The concentration of acrolein is attenuated with an amine.

5 Claims, No Drawings

METHOD OF ATTENUATING CONCERNTRATION OF ACROLEIN

TECHNICAL FIELD

This invention generally relates to a method of attenuating concentration of acrolein and to materials and manufactured articles prepared by the method.

INTRODUCTION

Acrolein is mentioned as a component of materials in US 2006/0160848 A1; U.S. Pat. No. 5,760,283; US 2004/0267054 A1; JP 61002056 B2; JP 58001108 B2; *J. Agric. Food Chem.*, 2009; 57:1065-1069; and *J. Neurochem.* 2009; 111: 1348-1356.

US 2013/0053520 A1 to M. Yamaura, et al. relates to a crosslinking agent for a crosslinkable elastomer which is said to be excellent in the heat resistance and rapid in the crosslinking rate in comparison with triallyl isocyanurate (TAIC). The crosslinking agent comprises a triazine derivative represented by a Chemical Formula I shown therein.

US 2015/0203701 A1 to Y. Sun, et al. relates to crosslinkable polymeric compositions, methods for making the same, and articles made therefrom. The crosslinkable polymeric compositions comprise an ethylene-based polymer, an organic peroxide, and a polyallyl crosslinking coagent, where the polyallyl crosslinking coagent and the organic peroxide are present in amounts sufficient to provide an allyl-to-active oxygen molar ratio of at least 1.6, based on allyl content of the polyallyl crosslinking coagent and the active oxygen content of the organic peroxide. Such crosslinkable polymeric compositions can be employed in forming coated conductors.

WO 2015/149634 A1 to Y. Sun, et al. relates to crosslinkable polymeric compositions with N,N,N',N',N'',N''-hexaallyl-1,3,5-triazine-2,4,6-triamine, methods for making the same, and articles made therefrom. The crosslinkable polymeric compositions comprise a thermoplastic, non-elastomer ethylene-based polymer, an organic peroxide, and a crosslinking coagent comprising N,N,N',N',N'',N''-hexaallyl-1,3,5-triazine-2,4,6-triamine. Such crosslinkable polymeric compositions and their crosslinked forms may be employed as polymeric layers in wire and cable applications, such as insulation in power cables.

SUMMARY

We (the present inventors) have discovered that some mixtures of compounds contain, create, form, generate, make, or produce acrolein, a harmful volatile organic compound, as a by-product, degradation product, or decomposition product. We have conceived a technical solution to this problem that prevents formation of acrolein or, if acrolein is formed, reacts with the formed acrolein, thereby attenuating concentration of acrolein in the mixtures. A method of attenuating concentration of acrolein in a mixture, and materials and articles prepared by the method. Concentration of acrolein is attenuated with an amine.

DETAILED DESCRIPTION

The Brief Summary and Abstract are incorporated here by reference. Examples of embodiments include the following numbered aspects.

Aspect 1. A method of producing a treated mixture that is free of acrolein or that has a lower concentration of acrolein than a comparative untreated mixture, the method comprising contacting a starting mixture comprising constituent (A) at least one compound that is not acrolein and constituent (B) acrolein, or comprising constituent (A) and constituent (C) an acrolein-forming precursor composition, with an effective amount of an amine of formula (I) $R^1R^2R^3N$ (I) so as to produce a treated mixture comprising constituent (A) at least one compound that is not acrolein, wherein the treated mixture is free of acrolein or has a concentration of acrolein that is from greater than (>) 0 percent to less than (<) 50 percent of a first concentration of acrolein in the comparative untreated mixture when both of the treated and untreated mixtures are tested according to Acrolein Test Method 1; wherein constituent (A) of the treated mixture is the same as, or a product of a reaction of, the constituent (A) of the starting mixture, with the proviso that the amine of formula (I) is free of —SH; a silicon atom; a 1,2-dihydroquinolinyl; a nitrogen-bonded atom selected from N, O, and S; and a nitrogen-bonded group selected from allyl, a carbamoyl group, and an oxymethylene group. In some aspects $R^1$ is a monovalent ($C_1$-$C_{20}$)aliphatic group, a monovalent ($C_1$-$C_{20}$)heteroaliphatic group, a monovalent ($C_6$-$C_{14}$)aryl group, or a monovalent ($C_2$-$C_{12}$)heteroaryl group; and each of $R^2$ and $R^3$ is independently H, a monovalent ($C_1$-$C_{20}$)aliphatic group, or a monovalent ($C_1$-$C_{20}$)heteroaliphatic group; or $R^1$ and $R^2$ are bonded together to give a divalent group of formula —$R^{1a}$—$R^{2a}$—, wherein the divalent group is a divalent ($C_2$-$C_{20}$)aliphatic group, or a divalent ($C_1$-$C_{20}$)heteroaliphatic group and $R^3$ is H, a monovalent ($C_1$-$C_{20}$)aliphatic group, or a monovalent ($C_1$-$C_{20}$)heteroaliphatic group; or $R^1$ and $R^2$ and $R^3$ are bonded together to give a trivalent group of formula —$R^{1a}$—$R^{2a}$—$R^{3a}$—, wherein the trivalent group is a trivalent ($C_3$-$C_{20}$)aliphatic group, or a trivalent ($C_2$-$C_{20}$)heteroaliphatic group. Each aliphatic group, heteroaliphatic group, aryl group, and heteroaryl group is independently unsubstituted or substituted with 1 to 5 substituents independently selected from a halogen atom, oxo (i.e., =O), —OR, —$NR_2$, wherein each R is independently H, an unsubstituted ($C_1$-$C_{20}$)hydrocarbyl group or an unsubstituted ($C_1$-$C_{20}$)heterohydrocarbyl group. Each heteroaliphatic group, heterohydrocarbyl group, and heteroaryl group independently contains from 1 to 8 heteroatoms independently selected from O and N. Each monovalent ($C_1$-$C_{20}$)aliphatic group and a monovalent ($C_1$-$C_{20}$) heteroaliphatic group has its radical on a carbon atom and each divalent ($C_2$-$C_{20}$)aliphatic group and divalent ($C_1$-$C_{20}$) heteroaliphatic group has its two radicals on carbon atoms.

Aspect 2. The method of aspect 1 wherein (i) the starting mixture comprises the constituent (A) at least one compound that is not acrolein and the constituent (B) acrolein; or (ii) the constituent (A) of the treated mixture is the same as the constituent (A) of the starting mixture; or (iii) both (i) and (ii).

Aspect 3. The method of aspect 1 wherein (i) the starting mixture comprises the constituent (A) at least one compound that is not acrolein and the constituent (C) acrolein-forming precursor composition; or (ii) constituent (A) of the treated mixture is the product of a reaction of the constituent (A) of the starting mixture; or (iii) both (i) and (ii).

Aspect 4. The method of aspect 3 wherein the constituent (C) acrolein-forming precursor composition comprises (C1) an organic peroxide and (C2) a compound containing an oxygen-bonded allyl group or nitrogen-bonded allyl group.

Aspect 5. The method of aspect 4 wherein (i) the (C2) compound containing an oxygen-bonded allyl group or nitrogen-bonded allyl group is a crosslinking coagent for crosslinking a crosslinkable prepolymer or polymer.

Aspect 6. The method of aspect 4 or 5 wherein (i) the (C2) compound containing an oxygen-bonded allyl group or nitrogen-bonded allyl group is an N-allyl guanidine compound or an N-allyl imide compound; or (ii) the (C1) organic peroxide is a perorgano peroxide; or (iii) both (i) and (ii).

Aspect 7. The method of aspect 4, 5, or 6 wherein (i) the (C2) compound containing an oxygen-bonded allyl group or nitrogen-bonded allyl group is N,N,N',N',N'',N''-hexaallyl-1,3,5-triazine-2,4,6-triamine or 1,3,5-triallyl-1,3,5-triazine-2,4,6-(1H,3H,5H)-trione; or (ii) the organic peroxide is dicumyl peroxide; or (iii) both (i) and (ii).

Aspect 8. The method of any one of aspects 1 to 7 wherein the constituent (A) at least one compound that is not acrolein and is also not an acrolein-forming precursor compound. In some aspects the constituent (A) is constituent (A1) a crosslinkable thermoplastic polymer, or constituent (A2) a crosslinked thermoplastic polymer prepared by curing (A1), or constituent (A3) a mixture of constituents (A1) and (A2).

Aspect 9. The method of any one of aspects 1 to 8 wherein the starting mixture comprises constituents (A) and (C) such that the starting mixture comprises a crosslinkable polymer composition comprising constituents (A1-1ab), (C1) and (C2): (A1-1ab) a crosslinkable thermoplastic, non-elastomer ethylene-based polymer; (C1) organic peroxide; (C2) compound containing an oxygen-bonded allyl group or nitrogen-bonded allyl group that is N,N,N',N',N'',N''-hexaallyl-1,3,5-triazine-2,4,6-triamine or 1,3,5-triallyl-1,3,5-triazine-2,4,6-(1H,3H,5H)-trione; and wherein the contacting step further comprises heating, at a curing temperature, the crosslinkable polymer composition to give the treated mixture, wherein the treated mixture comprises constituent (A2-1ab) a crosslinked ethylene-based polymer, which is a product of curing constituent (A1-1ab), and (E) a product of a reaction of the amine of formula (I) with acrolein, wherein the treated mixture is free of acrolein or has a concentration of acrolein that is from >0 percent to less than 50% of the first concentration of (B) acrolein in the comparative untreated mixture when both of the treated and untreated mixtures are tested according to Acrolein Test Method 1.

Aspect 10. The method of any one of aspects 1 to 9 wherein the amine of formula (I) is a monoamine of formula (I-1): $R^{1a}R^{2a}R^{3a}N$ (I-1), with the proviso that the monoamine of formula (I-1) is free of —SH; a silicon atom; a 1,2-dihydroquinolinyl; a nitrogen-bonded atom selected from N, O, and S; and a nitrogen-bonded group selected from allyl, a carbamoyl group, and an oxymethylene group. In some aspects $R^{1a}$ is a monovalent $(C_1-C_{20})$aliphatic group, a monovalent $(C_1-C_{20})$oxaaliphatic group, a monovalent $(C_6-C_{14})$aryl group, or a monovalent $(C_2-C_{12})$heteroaryl group; and each of $R^{2a}$ and $R^{3a}$ is independently H, a monovalent $(C_1-C_{20})$aliphatic group, or a monovalent $(C_1-C_{20})$oxaaliphatic group; or $R^{1a}$ and $R^{2a}$ are bonded together to give a divalent group of formula —$R^{1b}$—$R^{2b}$—, wherein the divalent group is a divalent $(C_2-C_{20})$aliphatic group, or a divalent $(C_1-C_{20})$oxaaliphatic group and $R^{3a}$ is H, a monovalent $(C_1-C_{20})$aliphatic group, or a monovalent $(C_1-C_{20})$oxaaliphatic group; or $R^1$ and $R^2$ and $R^3$ are bonded together to give a trivalent group of formula —$R^{1a}$—$R^{2a}$—$R^{3a}$—, wherein the trivalent group is a trivalent $(C_3-C_{20})$ aliphatic group, or a trivalent $(C_2-C_{20})$heteroaliphatic group. Each aliphatic group, oxaaliphatic group, aryl group, and heteroaryl group is independently unsubstituted or substituted with 1 to 5 substituents independently selected from a halogen atom, oxo (i.e., =O), or —OR, wherein each R is independently H, an unsubstituted $(C_1-C_{20})$hydrocarbyl group or an unsubstituted $(C_1-C_{20})$oxahydrocarbyl group. Each oxaaliphatic group and oxahydrocarbyl group independently contains from 1 to 4 oxygen atoms. In some aspects each oxaaliphatic group independently contains from 2 to 12 carbon atoms. As used herein the term "monoamine" means a molecule or a collection of such molecules having only one amine nitrogen atom. As used herein, "amine nitrogen atom" is a nitrogen atom that is not in an aromatic ring and is not part of a double bond (e.g., not —C=N— or —N=O) or triple bond (e.g., not —C≡N). In some aspects the monoamine of formula (I-1) further contains a C=N bond.

Aspect 11. The method of aspect 10 wherein: each of $R^{2a}$ and $R^{3a}$ is H and $R^{1a}$ is an unsubstituted monovalent $(C_1-C_{20})$aliphatic group selected from unsubstituted $(C_1-C_{20})$ alkyl; or each $R^{2a}$ and $R^{3a}$ is H and $R^{1a}$ is substituted monovalent $(C_1-C_{20})$aliphatic group selected from substituted $(C_1-C_{20})$alkyl having 1 substituent selected from —OR, wherein each R is independently H or a substituted $(C_1-C_{20})$oxaaliphatic group having 1 substituent selected from —OR, wherein each R is independently H; or each $R^{2a}$ and $R^{3a}$ is H and $R^{1a}$ is a substituted monovalent $(C_1-C_{20})$ aliphatic group selected from substituted $(C_1-C_{20})$alkyl having 1 substituent selected from phenyl; or each $R^{2a}$ and $R^{3a}$ is H and $R^{1a}$ is an unsubstituted monovalent $(C_6-C_{14})$aryl group; or $R^{3a}$ is H and $R^{1a}$ and $R^{2a}$ are bonded together to give a divalent group of formula —$R^{1b}$—$R^{2b}$—, wherein the divalent group is an unsubstituted divalent $(C_2-C_{20})$aliphatic group; or each of $R^{1a}$, $R^{2a}$ and $R^{3a}$ is an unsubstituted $(C_1-C_{20})$alkyl group.

Aspect 12. The method of any one of aspects 1 to 9 wherein the amine of formula (I) is a diamine of formula (I-2): $R^4R^5N$—$R^{6a}$—$NR^7R^8$ (I-2), with the proviso that the diamine of formula (I-2) is free of —SH; a silicon atom; a 1,2-dihydroquinolinyl; a nitrogen-bonded atom selected from N, O, and S; and a nitrogen-bonded group selected from allyl, a carbamoyl group, and an oxymethylene group. In some aspects each of $R^4$ and $R^5$ is independently H, a monovalent $(C_1-C_{20})$aliphatic group, or a monovalent $(C_1-C_{20})$heteroaliphatic group; or $R^4$ and $R^5$ are bonded together to give a divalent group of formula —$R^{4a}$—$R^{5a}$—, wherein the divalent group is a divalent $(C_2-C_{20})$aliphatic group, or a divalent $(C_1-C_{20})$heteroaliphatic group; $R^{6a}$ is a divalent $(C_2-C_{20})$aliphatic group or a divalent $(C_3-C_{20})$heteroaliphatic group; and each of $R^7$ and $R^8$ is independently H, a monovalent $(C_1-C_{20})$aliphatic group, or a monovalent $(C_1-C_{20})$heteroaliphatic group; or $R^7$ and $R^8$ are bonded together to give a divalent group of formula —$R^{7a}$—$R^{8a}$—, wherein the divalent group is a divalent $(C_2-C_{20})$aliphatic group, or a divalent $(C_1-C_{20})$heteroaliphatic group; or $R^4$ and $R^7$ are bonded together to give a divalent group of formula —$R^{4a}$—$R^{7a}$—, wherein the divalent group is a divalent $(C_3-C_{20})$ aliphatic group, or a divalent $(C_2-C_{20})$heteroaliphatic group. Each aliphatic group, heteroaliphatic group, aryl group, and heteroaryl group is independently unsubstituted or substituted with 1 to 5 substituents independently selected from a halogen atom, oxo (i.e., =O), —OR, —$NR_2$, wherein each R is independently H, an unsubstituted $(C_1-C_{20})$hydrocarbyl group or an unsubstituted $(C_1-C_{20})$heterohydrocarbyl group. Each heteroaliphatic group, heterohydrocarbyl group, and heteroaryl group independently contains from 1 to 8 heteroatoms independently selected from O and N. The term "diamine" as used herein means a molecule or a collection of such molecules having at least 2 amine nitrogen atoms spaced apart from each other by the divalent group, $R^{6a}$. In some aspects the diamine has only 2 amine nitrogen atoms. In other aspects the diamine has 3, alternatively 4, alternatively 5 amine nitrogen atoms. In some aspects the diamine of formula (I-2) further contains a C=N bond.

Aspect 13. The method of aspect 12 wherein: each of $R^4$, $R^5$, $R^7$ and $R^8$ is H; and $R^{6a}$ is an unsubstituted divalent ($C_2$-$C_{20}$)aliphatic group; or each of $R^4$, $R^5$ and $R^7$ is H; $R^{6a}$ is an unsubstituted divalent ($C_2$-$C_{20}$)aliphatic group; and $R^8$ is a substituted monovalent ($C_1$-$C_{20}$)aliphatic group selected from substituted ($C_1$-$C_{20}$)alkyl having 1 substituent selected from —OR, wherein R is H; or each of $R^4$ and $R^8$ is a substituted monovalent ($C_1$-$C_{20}$)aliphatic group selected from an oxo-substituted ($C_1$-$C_{20}$)alkyl group; $R^{6a}$ is an unsubstituted divalent ($C_2$-$C_{20}$)aliphatic group selected from an unsubstituted ($C_2$-$C_{20}$)alkylene group; and each of $R^5$ and $R^7$ is an unsubstituted monovalent ($C_1$-$C_{20}$)heteroaliphatic group; or the diamine of formula (I-2) is poly[(6-morpholino-s-triazine-2,4-diyl [2,2,6,6-tetramethyl-4-piperidinyl)imino]-hexamethylene [2,2,6,6-tetramethyl-4-piperidyl) imino]] having a molecular weight of about 1,600±160.

Aspect 14. A treated mixture produced by the method of any one of aspects 1 to 13 wherein constituent (A) of the treated mixture is the product of a reaction of the constituent (A) of the starting mixture.

Aspect 15. The treated mixture of aspect 14 wherein constituent (A) of the starting mixture is (A1-1ab) a crosslinkable thermoplastic, non-elastomer ethylene-based polymer and constituent (A) of the treated mixture is (A2-1ab) a crosslinked ethylene-based polymer formed by curing the constituent (A1-1ab).

Aspect 16. A manufactured article comprising (A2-1ab) a crosslinked ethylene-based polymer formed by curing the constituent (A1-1ab) during the method of any one of aspects 1 to 13.

Aspect 17. The inventive embodiment of any one of aspects 1 to 16, wherein the effective amount of the amine of formula (I) is measured relative to the amount of acrolein or the amount of the acrolein-forming precursor compound (the source of in situ formed acrolein), as the case may be. In some aspects the amount of the amine of formula (I) is from 0.001 part to 0.2 part, alternatively 0.005 part to 0.10 part, alternatively from 0.008 part to 0.06 part, all per 100 parts of acrolein or of the acrolein-forming precursor compound, as the case may be.

Aspect 18. The inventive embodiment of any one of aspects 1 to 17, wherein the amount of acrolein in the treated mixture is measured relative to the amount of the acrolein-forming precursor compound (the source of in situ formed acrolein) in the embodiment of the starting mixture containing same, wherein the amount of acrolein in the treated mixture is not detectable (ND) by Gas Chromatography Method 1 described later or the amount of acrolein in the treated mixture is from 0.05 part per million (ppm) to 20 ppm, alternatively 0.09 ppm to 15 ppm, alternatively 0.1 ppm to 10 ppm, all relative to the acrolein-forming precursor compound, as detected by Gas Chromatography Method 1 described later.

Aspect 19. The inventive embodiment of any one of aspects 1 to 11 or any one of aspects 14 to 18 (depending from any one of aspects 1 to 11), wherein the amine of formula (I) is a monoamine of formula (I-1) that is triethylamine; cyclohexylamine; benzylamine; ethanolamine; 2-(2-aminoethoxy)ethanol; 2-naphthylamine; or dodecylamine. In some aspects the monoamine of formula (I-1) is a bicyclic compound having one bridgehead amine nitrogen atom and one C=N bond, such as in 1,8-diazabicyclo[5.4.0]undec-7-ene (DBU) or 1,5-diazabicyclo[4.3.0]non-5-ene (DBN). In other aspects the monoamine of formula (I-1) is not bicyclic.

Aspect 20. The inventive embodiment of any one of aspects 1 to 9, 12 and 13 or any one of aspects 14 to 18 (depending from any one of aspects 1 to 9, 12 and 13), wherein the amine of formula (I) is a diamine of formula (I-2) that is 1,6-hexanediamine; N,N'-bisformyl-N,N'-bis(-(2,2,6,6-tetramethyl-4-piperidinyl)-hexamethylenediamine (e.g., Uvinul 4050 H); aminoethylethanolamine; or poly[(6-morpholino-s-triazine-2,4-diyl [2,2,6,6-tetramethyl-4-piperidinyl)imino]-hexamethylene [2,2,6,6-tetramethyl-4-piperidyl)imino]] having a molecular weight of about 1,600±160 (e.g., CYASORB UV-3346). In some aspects the diamine of formula (I-2) is a bicyclic compound having one bridgehead amine nitrogen atom and one non-bridgehead amine nitrogen atom, such as in 1,8-diazabicyclo[5.4.0]undecane (dihydro-DBU) or 1,5-diazabicyclo[4.3.0]nonane (dihydro-DBN), or having two bridgehead amine nitrogen atoms as in 1,4-diazabicyclo[2.2.2]octane (DABCO). In other aspects the diamine of formula (I-2) is not bicyclic.

The amine of formula (I) excludes certain compounds via proviso. Examples of the compounds having a nitrogen-bonded atom selected from N, O, and S are hydrazines, hydroxylamines, and mercaptoamines (thiohydroxylamines), respectively. Examples of the compounds having a nitrogen-bonded carbamoyl group are urea compounds. Examples of the compounds having a nitrogen-bonded oxymethylene group are 4,4-dimethyl-1-oxa-3-azacyclopentane and 2,2-dimethyl-1-oxa-3-azacyclopentane. Examples of the amines having a silicon atom are silanes containing aminoalkyl groups. Examples of the amines having a 1,2-dihydroquinolinyl are polymerized 2,2,4-trimethyl-1,2-dihydroquinoline and the monomer 2,2,4-trimethyl-1,2-dihydroquinoline.

Constituent (A) at least one compound that is not acrolein. Constituent (A) is any compound or mixture of compounds that is not acrolein. Typically, constituent (A) is different than the (C1) organic peroxide and the (C2) compound containing an oxygen-bonded allyl group or nitrogen-bonded allyl group. The constituent (A) typically is a compound or mixture of compounds in need of attenuation of acrolein concentration or protection from acrolein. In some aspects constituent (A) is an organic compound. In some aspects the organic compound is an organic prepolymer or (non-)crosslinkable polymer. In some aspects the constituent (A) contains carbon, hydrogen, and optionally one or more of N, O, and S. In some aspects each constituent (A) is free of (lacks) a halogen atom.

Constituent (B) acrolein. Acrolein means a molecule, or a collection of molecules, having IUPAC name, prop-2-enal, and being of the formula $H_2C=C(H)-C(=O)H$.

Constituent (C) acrolein-forming precursor composition. Constituent (C) is any compound or mixture of compounds that is not acrolein, but may react or decompose to generate acrolein. Constituent (C) may be an acrolein acetal, wherein upon exposure to deprotection conditions (e.g., water/acid) liberates acrolein. Examples of suitable acrolein acetals are 2-vinyl-1,3-dioxolane and 2-vinyl-1,3-dioxane. Alternatively, constituent (C) may be a mixture of at least two reactants that may react to produce acrolein. The reaction may comprise reducing a carbon atom, alternatively oxidizing a carbon atom. An example of such a mixture of reactants comprises the (C1) organic peroxide and the (C2) compound containing an oxygen-bonded allyl group or nitrogen-bonded allyl group, which may react to form acrolein.

The (C) acrolein-forming precursor composition may form acrolein by any means. In some aspects acrolein may be formed by heating the (C) acrolein-forming precursor composition. In other aspects acrolein may be formed by adding a radical initiator to the (C) acrolein-forming precursor composition. In other aspects acrolein may be formed by irradiating the (C) acrolein-forming precursor composition. Alternatively, combinations of the foregoing means may be used to form acrolein from the (C) acrolein-forming precursor composition.

In order to characterize an extent of attenuation of concentration of acrolein achieved by the method, optionally both the treated mixture (inventive) and the comparative untreated mixture may be characterized according to Acrolein Test Method 1. The Acrolein Test Method 1 comprises adding the treated mixture or the comparative untreated mixture into different ones of 20 mL volume Gas Chromatography (GC)-suitable silicate glass vials, crimp-capping the vial containing the treated mixture and the vial containing the comparative untreated mixture, heating the crimp-capped vials in the GC instrument of GC Method 1 (described later) at 140° C. for 30 minutes, and thereafter determining concentration of acrolein in each vial according to the GC Method 1 described later.

When characterized according to Acrolein Test Method 1, the treated mixture may be free of acrolein or may have a concentration of acrolein that is from >0 percent to less than 50 percent of the first concentration of acrolein in the comparative untreated mixture. The comparative untreated mixture is identical to the particular treated mixture to which it is being compared except the comparative untreated mixture is free of (lacks) the amine of formula (I). When the comparative untreated mixture, before the heating step of the Acrolein Test Method 1, contains acrolein, the acrolein is at the first concentration therein. When the comparative untreated mixture, before the heating step of the Acrolein Test Method 1, does not contain acrolein, or contains acrolein below level of detection by GC Method 1, the heating step of Acrolein Test Method 1 will cause formation of acrolein therein, thereby generating in situ the first concentration of acrolein in the comparative untreated mixture. When the treated mixture, before the heating step of the Acrolein Test Method 1, contains the (C) acrolein-forming precursor composition, the amine of formula (I) may: (i) inhibit or prevent formation of acrolein in the treated mixture during the heating step of the Acrolein Test Method 1 and/or (ii) allow formation of acrolein in the treated mixture during the heating step of the Acrolein Test Method 1, but then scavenge or react with the formed acrolein. The concentration of acrolein is attenuated in the treated mixture both before the heating step, as well as after the heating step in circumstance (i) and/or (ii).

As used herein, the expression "attenuating concentration of acrolein" means (a) being configured and ready for preventing or inhibiting formation of acrolein from an acrolein-containing precursor composition, which may be referred to herein as protecting the treated mixture; (b) being configured and ready for scavenging or reacting with acrolein, which may be referred to herein as protecting the treated mixture; (c) actively preventing formation of acrolein from an acrolein-containing precursor composition, which may be referred to herein as inhibiting the treated mixture; (d) actively scavenging or reacting with acrolein, which may be referred to herein as reacting acrolein in the treated mixture; (e) containing a product of a reaction of the amine of formula (I) with acrolein, which reaction product may be referred to herein as a treated mixture that has been scavenged; or (f) any two or more of (a) to (e). The treated mixture is treated in each of circumstances (a) to (f).

Every aspect of the treated mixture and method is expected to attenuate concentration of acrolein. The extent of attenuation of concentration of acrolein in the treated mixture during the Acrolein Test Method 1 may vary from aspect to aspect depending upon one or more factors such as the concentration of the acrolein, if any, in the treated mixture; the composition and amount of the (C) acrolein-forming precursor composition, if any, in the treated mixture; the structure of the particular amine of formula (I) used, the effectiveness of the amine of formula (I) at attenuating the concentration of acrolein therein; and the amount and composition of constituent (A) at least one compound that is not acrolein. A person of ordinary skill in this art is able to apply our teachings to improve the extent of attenuation from aspect to aspect. In some aspects the treated mixture after being heated in the Acrolein Test Method 1 is free of acrolein, alternatively has acrolein, but at a concentration below a level of detection by GC Method 1, alternatively has a detectable concentration of acrolein that is from >0 percent (%) to less than 50%, alternatively from >0% to less than 40%, alternatively from >0% to less than 35%, alternatively from >0% to less than 20%, alternatively from >0% to less than 10%, alternatively from at least 0.01% to at most any one of: 35%, 10%, 5%, and 1.0%; all of the first concentration of acrolein in, or formed in the comparative untreated mixture. In some aspects the foregoing ranges having a lower endpoint of >0% are replaced with identical ranges except wherein the lower endpoint is >lowest detection limit, %, of GC Method 1.

In some aspects the method is used for attenuating concentration of acrolein in a starting mixture comprising the constituent (A) at least one compound that is not acrolein and (B) acrolein. In some aspects the constituent (A) is also not the acrolein-forming precursor compound. In such aspects the attenuating comprises reducing the concentration of acrolein in the starting mixture, with or without separately and independently reacting constituent (A). Such attenuating may be characterized as scavenging or reacting acrolein.

In some aspects the method is used for attenuating concentration of acrolein in a starting mixture that may not contain acrolein, but otherwise may be configured or predisposed to produce acrolein in situ (in the absence of the amine of formula (I)). In such aspects the starting mixture may contain the (C) acrolein-forming precursor composition and the constituent (A). In such aspects the attenuating comprises inhibiting or preventing formation of acrolein and/or reducing the concentration of any acrolein formed as a product of a reaction of the (C) acrolein-forming precursor composition. Such reactions may produce acrolein as a by-product, a decomposition product, or a degradation product. In some aspects the purity of the (C) acrolein-forming precursor composition, particularly the purity of the (C2) compound containing an oxygen-bonded allyl group or nitrogen-bonded allyl group, may influence the amount of acrolein produced. In general the lower the purity of the (C2) compound containing an oxygen-bonded allyl group or nitrogen-bonded allyl group that is used (i.e., the greater the amount of impurities that are structurally related to the (C2) compound (i.e., not amine of formula I), (A), or (C1)), the greater the amount of acrolein that is produced by such reactions, all other things being equal. In some aspects the (C2) compound containing an oxygen-bonded allyl group or nitrogen-bonded allyl group, used to prepare the (C) acrolein-forming precursor composition, is a mixture that has a purity of (C2) compound containing an oxygen-bonded allyl group or nitrogen-bonded allyl group is 50 wt % to 100 wt %, alternatively 80 wt % to 100 wt %, alternatively 95 wt % to 100 wt %, alternatively 97 wt % to 99 wt %, based on total weight of the mixture. As above, the latter attenuating may be characterized as scavenging or reacting acrolein, whereas the former attenuating may be characterized as inhibiting or preventing formation of acrolein. In some aspects the attenuating comprises both scavenging/reacting acrolein and inhibiting/preventing formation of acrolein.

Aspects of the method are useful for treating any starting mixture in need of attenuation of acrolein concentration. Such a starting mixture may contain acrolein. Alternatively, such a starting mixture may not contain acrolein, but may be predisposed to produce acrolein in situ, such as by reactions that may produce acrolein as a by-product, a decomposition product, or a degradation product. A starting mixture that may be successfully treated by the method may include a biologic system containing an alpha,beta-unsaturated aldehyde wherein the biologic system is configured or predisposed for forming acrolein in situ such as ex vivo or in vivo. Alternatively, the starting mixture may include a gaseous or liquid mixture from an industrial process stream (feed stream, reaction mixture, or reactor effluent). The method advantageously may be used in combination with, alternatively without use of, any other type of acrolein scavenger (e.g., a hydrazine) or technique (e.g., molecular sieves).

Although the method may be used with any starting mixture in need of attenuation of acrolein concentration, it is convenient to further illustrate the method using aspects of the starting mixture that contain the (C) acrolein-forming precursor composition and the constituent (A). It is further convenient to illustrate such aspects by way of specific aspects or examples of constituents (A) and (C) using a starting mixture comprising a crosslinkable polymeric material such as (A-1) a crosslinkable thermoplastic polymer, such as (A-1a) a crosslinkable thermoplastic, ethylene-based polymer, which is used in the wire and cable industries. The method and other inventive aspects, however, are not limited to such illustrative aspects or examples.

In some aspects the (A-1) crosslinkable thermoplastic polymer is the (A-1a) crosslinkable thermoplastic, ethylene-based polymer; alternatively (A-1b) a crosslinkable thermoplastic, non-elastomer polymer; alternatively (A-1 ab) a crosslinkable thermoplastic, non-elastomer ethylene-based polymer.

In some aspects the starting mixture is the crosslinkable polymer composition comprising (A1-1ab) a crosslinkable thermoplastic, non-elastomer ethylene-based polymer; (C1) organic peroxide; and (C2) compound containing an oxygen-bonded allyl group or nitrogen-bonded allyl group. In some aspects the starting mixture is the crosslinked polymer composition comprising the (A2-1ab) crosslinked thermoplastic, non-elastomer ethylene-based polymer; (C1) organic peroxide; and (C2) compound containing an oxygen-bonded allyl group or nitrogen-bonded allyl group. The (C2) compound containing an oxygen-bonded allyl group or nitrogen-bonded allyl group may function in the crosslinkable polymer composition as a crosslinking coagent in the same manner as described for crosslinking coagents in WO 2015/149634 A1 or WO 2014/040532 A1. The (C2) compound and the (C1) compound may be present in amounts sufficient to provide an allyl-to-active oxygen molar ratio of at least 1.6, based on allyl content of the (C2) compound and the active oxygen content of the (C1) compound. In some aspects (C2) is a compound containing a nitrogen-boned allyl group. The compound containing a nitrogen-bonded allyl group may be N,N,N',N',N'',N''-hexaallyl-1,3,5-triazine-2,4,6-triamine (HATATA); alternatively 1,3,5-triallyl-1,3,5-triazine-2,4,6-(1H,3H,5H)-trione (TAIC); alternatively a combination thereof. In some aspects (C2) is a compound containing an oxygen-bonded allyl group. The compound containing an oxygen-bonded allyl group may be triallyl cyanurate (TAC), triallyl trimellitate (TATM), triallyl ortho-formate, pentaerythritol triallyl ether, triallyl citrate, triallyl aconitate, or a combination thereof.

The "ethylene-based" polymers are macromolecular compounds prepared from ethylene monomers and have repeat units derived from the ethylene monomers as the primary (i.e., greater than 50 weight percent ("wt %")) components or units. When the repeat units derived from ethylene monomers are less than 100 wt % of the ethylene-based polymer, then the polymers have repeat units derived from co-monomers other than ethylene monomers.

Crosslinkable ethylene-based polymers suitable for use herein are thermoplastic. The term "thermoplastic" denotes a polymer that becomes pliable or moldable above a specific temperature and returns to a solid state upon cooling. In some aspects, the ethylene-based polymer is an elastomer. "Elastomers" are defined as materials which experience large reversible deformations under relatively low stress. Some examples of commercially available elastomers include natural rubber, ethylene/propylene (EPM) copolymers, ethylene/vinyl acetate copolymers, ethylene/propylene/diene (EPDM) copolymers, styrene/butadiene copolymers, chlorinated polyethylene, and silicone rubber. In other aspects, the ethylene-based polymer is not an elastomer.

The ethylene-based polymer may be non-polar. Here "non-polar" denotes a polymer containing no C—O, C—N, C—S, or C-halogen bonds or bonds between carbon atoms and other atoms having a higher electronegativity relative to carbon or denotes a polymer where, if such polar bonds are present, there is no net dipole because the polar bonds are arranged symmetrically. In some aspects the ethylene-based polymer contains no polar bonds between carbon atoms and other atoms having higher electronegativity relative to carbon.

In some aspects the ethylene-based polymer may have no repeat units derived from halide-containing monomers incorporated therein. In some aspects the ethylene-based polymer may have repeat units derived from fluoromonomers or chloromonomers. In such aspects the ethylene-based polymer is neither a fluoropolymer nor a chloropolymer.

The ethylene-based polymer may be an ethylene homopolymer. As used herein, "homopolymer" denotes a polymer consisting of repeating units derived from a single monomer type, but does not exclude residual amounts of other components used in preparing the homopolymer, such as chain transfer agents.

The ethylene-based polymer may be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers may have an α-olefin content of >0 to less than 50 wt %, >0 to less than 45 wt %, >0 to less than 40 wt %, or >0 to less than 35 wt % based on the entire interpolymer weight. When an α-olefin is employed, the α-olefin may be a ($C_3$-$C_{20}$) α-olefin, which has 3 to 20 carbon atoms and is linear, branched or cyclic. Examples of α-olefins include propene, 1-butene, 4-methyl-1-pentene, 1-hexene, 1-octene, 1-decene, 1-dodecene, 1-tetradecene, 1-hexadecene, and 1-octadecene. Cyclic α-olefins may contain a cyclohexyl or cyclopentyl group such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

The ethylene-based polymer may be used alone or in combination with one or more other types of ethylene-based polymers. E.g., a blend of two or more ethylene-based polymers that differ from one another by monomer structure, composition, or content or that differ by their catalytic method of preparation. If a blend of ethylene-based polymers is employed, the polymers may be blended by any in-reactor or post-reactor process.

In some aspects the ethylene-based polymer may be selected from the group consisting of a low-density polyethylene (LDPE), alternatively a linear-low-density polyethylene (LLDPE), alternatively a very-low-density polyethylene (VLDPE), alternatively a combination or blend of any two or more thereof.

The LDPE may be highly a branched ethylene homopolymer, and may be prepared via a high pressure process (i.e., HP-LDPE). LDPEs suitable for use herein may have a density ranging from 0.91 to 0.94 gram per cubic centimeter (g/cm$^3$). The ethylene-based polymer may be a HP-LDPE having a density of at least 0.915 g/cm$^3$, but less than 0.94 g/cm$^3$, or less than 0.93 g/cm$^3$. Polymer densities provided herein are determined according to ASTM International ("ASTM") method D792. The LDPE may have a melt index (I$_2$) of less than 20 grams per 10 minutes (g/10 minutes), or ranging from 0.1 to 10 g/10 minutes, from 0.5 to 5 g/10 minutes, from 1 to 3 g/10 minutes, or an I$_2$ of 2 g/10 minutes. Melt indices provided herein are determined according to ASTM method D1238. Unless otherwise noted, melt indices are determined at 190° C. and 2.16 kilogram (kg) (i.e., I$_2$). Generally, the LDPEs have a broad molecular weight distribution (MWD) resulting in a relatively high polydispersity index (PDI) ratio of weight-average molecular weight to number-average molecular weight.

The LLDPE may be an ethylene-based polymer having a heterogeneous distribution of comonomer (e.g., α-olefin monomer), and characterized by short-chain branching. The LLDPE may be copolymers of ethylene and α-olefin monomers, such as those described above. LLDPEs suitable for use herein may have a density ranging from 0.916 to 0.925 g/cm$^3$. LLDPEs suitable for use herein may have a melt index (I$_2$) ranging from 1 to 20 g/10 minutes, or from 3 to 8 g/10 minutes.

The VLDPE may be an ultra-low-density polyethylene (ULDPE). VLDPEs are generally ethylene-based polymers having a heterogeneous distribution of comonomer (e.g., α-olefin monomer), and are characterized by short-chain branching. VLDPEs may be copolymers of ethylene and α-olefin monomers, such as one or more of those α-olefin monomers described above. VLDPEs suitable for use herein may have a density ranging from 0.87 to 0.915 g/cm$^3$. VLDPEs suitable for use herein may have a melt index (I$_2$) ranging from 0.1 to 20 g/10 minutes, or from 0.3 to 5 g/10 minutes.

The production processes used for preparing ethylene-based polymers are described in WO 2015/149634 A1, on page 4, line 25, to page 5, line 2.

The foregoing ethylene-based polymers, including crosslinkable and crosslinked aspects thereof, are all suitable for use as embodiments of constituent (A).

The (C1) organic peroxide is suitable for use herein include perorgano peroxides. A perorgano peroxide is a molecule or collection of molecules having at least one divalent peroxy group (—O—O—) wherein each oxygen atom of each divalent peroxy group is bonded to a hydrocarbyl group or hydrocarbylene group. The (C1) organic peroxide may be of formula R$^A$—O—O—R$^A$ or of formula R$^A$—O—O—R$^{AA}$—O—O—R$^A$. Each R$^A$ independently may be an unsubstituted or halogen-substituted hydrocarbyl group. Each R$^{AA}$ independently may be an unsubstituted or halogen-substituted hydrocarbylene group or R$^{6a}$. In an embodiment, the organic peroxide is a mono-functional peroxide, alternatively a di-functional peroxide. Examples of suitable organic peroxides are dicumyl peroxide (DCP); tert-butyl peroxybenzoate; di-tert-amyl peroxide (DTAP); bis(alpha-t-butyl-peroxyisopropyl) benzene (BIPB); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)-3,3,5-trimethylcyclohexane; isopropylcumyl cumylperoxide; butyl 4,4-di(tert-butylperoxy) valerate; di(isopropylcumyl) peroxide; and mixtures of two or more thereof. In some aspects, only a single type of organic peroxide is employed. In some aspects, at least one R$^A$ of the organic peroxide is 1-methyl-1-phenylethyl. In some aspects the organic peroxide is dicumyl peroxide (bis(1-methyl-1-phenylethyl) peroxide).

The amounts of the (A1) a crosslinkable thermoplastic polymer such as the (A1-1ab) a crosslinkable thermoplastic, non-elastomer ethylene-based polymer; (C1) organic peroxide; and (C2) compound containing an oxygen-bonded allyl group or nitrogen-bonded allyl group that is a crosslinking coagent used in the crosslinkable polymer composition is described in WO 2015/149634 A1, on page 6, eighth line from the bottom, to page 8, line 3.

In some aspects the crosslinkable polymer composition further comprises one or more additives that are different in structure than constituents (A1), (C1), (C2), and the amine of formula (I). Additives do not include acrolein. Examples of suitable additives include antioxidants, processing aids, fillers, coupling agents, ultraviolet light absorbers or stabilizers, antistatic agents, nucleating agents, slip agents, plasticizers, lubricants, viscosity control agents, tackifiers, antiblocking agents, surfactants, extender oils, acid scavengers, flame retardants, vehicles, and metal deactivators. The amounts of additives suitable for use in the crosslinkable polymer composition are those amounts described in WO 2015/149634 A1, on page 8, lines 8 to 11. Examples of suitable fillers are described in are described in WO 2015/149634 A1, on page 8, lines 12 to 14. Examples of suitable antioxidants are described in are described in WO 2015/149634 A1, on page 8, line 15, to page 9, line 2. The additives do not prevent or interfere with the attenuating aspect of the method.

Crosslinked polymer composition. In some aspects the crosslinked polymer composition is the crosslinked polymeric composition described in WO 2015/149634 A1, on page 10, lines 9 to 23, such as a crosslinked polyethylene. The crosslinked polymer compositions may be prepared by curing the crosslinkable polymer composition such as by the method described in WO 2015/149634 A1, on page 15, line 1, to page 19, line 13.

Manufactured article. In some aspects the manufactured article is a coated conductor described in WO 2015/149634 A1, on page 10, line 24, to page 11, line 20, except wherein the crosslinkable polymeric composition referenced therein comprises the treated mixture. This description includes the cable designs referenced in WO 2015/149634 A1, spanning pages 10 and 11 and illustrated in U.S. Pat. Nos. 5,246,783; 6,496,629; and 6,714,707; and the descriptions referenced in WO 2015/149634 A1, on page 11, of conventional extruders described in U.S. Pat. Nos. 4,857,600 and 5,575,965. The coated conductor may be a coated wire, coated cable, or coated conduit. The coating may comprise the crosslinked polymer composition such as a crosslinked polyethylene.

The wire and cable industries use medium voltage (MV), high voltage (HV), and extra-high voltage (EHV) cables, which contain, typically as an insulation layer, a crosslinked polymeric composition, such as a crosslinked polyethylene composition. Such a crosslinked polymeric composition may be prepared via a crosslinking reaction from a crosslinkable polymer composition having a crosslinkable prepolymer or polymer and a peroxide initiator. The crosslinking reaction comprises a radical reaction between peroxide and crosslinkable prepolymer or polymer (e.g., a polyethylene prepolymer or polymer), wherein the reaction generates a product mixture comprising the crosslinked polymer and undesirable products such as byproducts, degradation products, and/or decomposition products. After the product mixture has been formed as a layer (e.g., insulation layer) of a coating on a wire, cable, or other conduit (e.g., a glass fiber or other hollow tube), the resulting coated conductor is typically heated at elevated temperature in a degassing chamber to remove the undesirable products. The degassing is done before the coated conductor is used in a transmitting or conducting application.

We (the present inventors) recognized that when, as for example in WO 2015/149634 A1, the crosslinkable polymer composition further contains a compound containing an oxygen-bonded allyl group or a nitrogen-bonded allyl group, one of the undesirable products that is formed is acrolein when the composition is heated for extrusion. E.g., when the extrusion temperature is 100° to 160° C.; alternatively 100° to 150° C.; alternatively 110° to 150° C.; alternatively 120° to 150° C.; alternatively 130° to 150° C. The extrusion of the crosslinkable polymer composition may be performed partially exposed to air. We recognized that acrolein is also formed when the of the crosslinkable polymer composition is heated for curing (e.g., at 160° to 220° C.; alternatively 170° to 220° C.; alternatively 180° to 220° C.; alternatively 190° to 210° C.). Although the curing is typically done under an inert gas atmosphere such as a gas of molecular nitrogen, argon, or helium, the resulting crosslinked polymer composition is contaminated with acrolein. Degassing acrolein may be done by heating the coated conductor at elevated temperature in a degassing chamber. We discovered that degassing acrolein is an energy and time intensive operation. Additionally, the formation of and degassing acrolein may pose environmental and health risks if not properly addressed.

We conceived that degassing of acrolein advantageously may be minimized or avoided by using the method during the crosslinking reaction. For example, degassing of acrolein may be omitted after the inventive method is used or the time and/or temperature used for degassing acrolein may be decreased relative to time and/or temperature of a comparative composition wherein the inventive method is not used. Advantageously, the method is effective at elevated temperatures such as temperatures used for the aforementioned extrusion or curing of the crosslinkable polymer composition.

Any compound herein includes all its isotopic forms, including natural abundance forms and/or isotopically-enriched forms. The isotopically-enriched forms may have additional uses, such as medical or anti-counterfeiting applications, wherein detection of the isotopically-enriched form is helpful in treatment or investigation.

"Allyl" means the monovalent group of formula $H_2C=C(H)-CH_2-$. N,N,N',N',N",N"-Hexaallyl-1,3,5-triazine-2,4,6-triamine (HATATA) has Chemical Abstracts Service (CAS) number 2830-12-8.

1,3,5-Triallyl-1,3,5-triazine-2,4,6-(1H,3H,5H)-trione, also known as triallyl isocyanurate (TAIC) has CAS No. 1025-15-6.

N,N'-Bisformyl-N,N'-bis(-(2,2,6,6-tetramethyl-4-piperidinyl)-hexamethylenediamine (e.g., Uvinul 4050 H) has CAS No. 124172-53-8.

Poly[(6-morpholino-s-triazine-2,4-diyl [2,2,6,6-tetramethyl-4-piperidinyl)imino]hexamethylene [2,2,6,6-tetramethyl-4-piperidyl)imino]] having a molecular weight of about 1,600±160 (e.g., CYASORB UV-3346) has CAS No. 082451-48-7.

Unless otherwise defined herein, named general terms have the following meanings. Alternatively precedes a distinct embodiment. Articles "a", "an", and "the" each refer to one or more. ASTM means the standards organization, ASTM International, West Conshohocken, Pa., USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). A Markush group of members A and B may be equivalently expressed as: "a member selected from A and B"; "a member selected from the group consisting of A and B"; or "a member A or B". Each member may independently be a subgenus or species of the genus. May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature is 23° C.±1° C. unless indicated otherwise. Substituted when referring to a compound means having, in place of hydrogen, one or more substituents, up to and including per substitution.

EXAMPLES

First low-density polyethylene (LDPE 1): has a melt index ($I_2$) of 2 g/10 minutes and a density of 0.920 g/cm$^3$. LDPE 1 is produced by The Dow Chemical Company, Midland, Mich.

Second LDPE ("LDPE 2") is a formulation that contains 99.622 wt % LDPE 1, 0.14 wt % Cyanox 1790 (from Cytec Industries), 0.23 wt % distearyl thiodipropionate ("DSTDP") (from Reagens) and 0.008 wt % Cyasorb UV 3346 (from Cytec Industries). Cyanox 1790 is tris[(4-tert-butyl-3-hydroxy-2,6-dimethylphenyl)methyl]-1,3,5-triazinane-2,4,6-trione and has CAS number 40601-76-1.

Constituent (C1-1): Dicumyl peroxide (DCP). DCP is commercially available from Shanghai Fangruida Chemicals Co., Ltd.

Constituent (C2-1): N,N,N',N',N",N"-hexaallyl-1,3,5-triazine-2,4,6-triamine (HATATA) is synthesized according to the procedure described in WO 2015/149634 A1, page 14, lines 15 to 29, except produce the HATATA on a 1 kilogram (kg) scale using a one batch process, and purify the produced HATATA by chromatography on one 25 cm×100 cm silica gel column.

Constituent (C2-2): Triallyl isocyanurate ("TAIC") is commercially available from Shanghai Fangruida Chemicals Co., Ltd.

Gas Chromatography (GC) Method 1: Instrument Agilent 7890A Gas Chromatography System. Column: J&W 122-5533 DB-5 MS (30 meters (m)×0.25 millimeter (mm) inner diameter (ID)×1.0 micrometer (μm) film). Oven/Run conditions: 40° C., hold 3 minutes; 15° C./minute ramp to 250° C., hold for 3 minutes; total run time 20 minutes. Injection: autosampler system 1 microliter (μL) by 10 μL syringe. Inlet: injector temperature 250° C.; split ratio: 5:1. Detector: Mass selective detector (MSD). MS Source Temperature: 230° C.; MS Quad Temperature: 150° C.; Aux-2 Temperature: 280° C.; Acq. Mode: Scan Mass from 29 to 350.

Gas Chromatography-Mass Spectroscopy (GC-MS) Method 1: Instrument Agilent G1888 Headspace Sampler. Oven temperature: 140° C. Loop temperature: 160° C. Transfer line temperature: 170° C. Multi HS Extr OFF. Shaking OFF. Vial Equilibration: 30 minutes. Pressurization: 0.5 minute. Fill: 0.1 minute. Equilibration: 0.05 minute. Inject: 0.5 minute. GC Cycle: 30 minutes.

High Performance Liquid Chromatography-Mass Spectroscopy (HPLC-MS) Method 1: Instrument Agilent 1220 HPLC/G6224A TOF mass spectrometer. Column: Agilent eclipse plus-C8 2.1*150 mm, 3.5 μm. Column oven temperature: 30° C. Solvent: A: acetonitrile; B: 10 millimolar (mM) ammonium formate in water/acetonitrile (95/5 v/v). Gradient: 0 to 1 minute 0% A/100% B, 1 to 15 minutes 0% to 95% A/100% B to 5% B, hold for 9 minutes. Flow rate: 0.3 mL/minute. UV detector: diode array 254 nanometers (nm). MS Condition: Capillary voltage: 3900 kilovolts (kV) (Neg.), 3500 kV (Pos). Mode: Neg and Pos. Scan: 100 to 2,000 atomic mass units (amu). Rate: 1 second per scan (s/scan). Desolvation temperature: 300° C. Lock spray: Neg: 199.036320, 1033.988109; Pos: 121.050873, 922.009798.

Determine acrolein by preparing a standard acrolein solution in N,N-dimethylformamide (DMF) with a concentration similar to test samples: weigh acrolein (150 mg±20 mg) and DMF (15 g±2 g) into a vial, and then dilute the vial contents to 100 times to give a standard having a known concentration of acrolein. Then subject the standard to GC Method 1 to correlate that standard concentration with acrolein GC peak area.

CE1 means Comparative Example 1; IE1 means Inventive Example 1; and so on.

CE1: weigh HATATA into a 20 mL volume GC vial, crimp cap the vial to give a comparative starting mixture that does not contain acrolein and does not contain the amine of formula (I). Then heat the crimp-capped vial in the GC instrument at 140° C. for 30 minutes, and then determine the amount of acrolein in the headspace of the vial using GC Method 1. Compare the amount of acrolein in the headspace to the starting amount of HATATA, in parts per million (ppm). Set this amount in ppm equal to the first concentration of acrolein. Results are reported later in Table 1.

IE1 to IE11: Acrolein Concentration Attenuation Test Method 1: weigh HATATA and amine of formula (I) into separate 20 mL volume GC vials, crimp cap the vials to give starting mixtures that do not contain acrolein but do contain the amine of formula (I). Then preheat the crimp-capped vials in the GC instrument at 140° C. for 30 minutes, and then determine the amounts of acrolein in the headspace of the vials using GC Method 1. Compare these amounts of acrolein in the headspaces to the respective starting amounts of HATATA, in ppm. Compare the amounts of acrolein in ppm to the first concentration of acrolein of CE 1, expressed as a percentage. Results are reported below in Table 1.

TABLE 1

Acrolein Concentration Attenuation Test Results.

| Ex. No. | Starting amount of HATATA (mg) | Amine of formula (I) | Starting amount of Amine of formula (I) (mg) | Amount of Acrolein (ppm relative to HATATA) | Concentration of Acrolein relative to First Concentration |
|---|---|---|---|---|---|
| CE1 | 209 | None | 0 | 185 (first concentration) | 100% |
| IE1 | 206 | 1,6-Hexanediamine | 9.7 | Not detected (ND) | 0% or ND |
| IE2 | 204 | Triethylamine | 24.5 | 4.1 | 2.2% |
| IE3 | 223 | Uvinul 4050H | 5.1 | 5.1 | 2.8% |
| IE4 | 213 | Cyclohexylamine | 10.2 | Not detected | 0% or ND |
| IE5 | 198 | Benzylamine | 11.1 | Not detected | 0% or ND |
| IE6 | 213 | Ethanolamine | 11.5 | Not detected | 0% or ND |
| IE7 | 197 | Aminoethylethanolamine | 1.8 | Not detected | 0% or ND |
| IE8 | 201 | 2-(2-Aminoethoxy)ethanol | 2.2 | 0.5 | 0.27% |
| IE9 | 206 | 2-Nathylamine | 1.8 | 1.1 | 0.59% |
| IE10 | 213 | Dodecylamine | 2.3 | 6.3 | 3.4% |
| IE11 | 210 | CYASORB UV-3346 | 2.6 | 6.4 | 3.5% |

The data in Table 1 show the starting mixture of HATATA and amine of formula (I) in IE1 to IE11 show significantly lower concentration of acrolein after heating. In contrast in CE1, the starting mixture that is heated without an amine of formula (I) shows a significantly higher amount of acrolein relative to HATATA (source of acrolein).

CE2: prepare a solution of acrolein (159.7 mg) in DMF (16.532 g), and then weigh an aliquot of the acrolein solution into a 20 mL volume GC vial, crimp cap the vial to give a starting mixture that contains acrolein. Then heat the crimp-capped vial in the GC instrument at 140° C. for 30 minutes, and then determine the amount of acrolein in the headspace of the vial using GC Method 1. Compare the amount of acrolein in the headspace to the starting amount of HATATA, in ppm. Set this amount in ppm equal to the first concentration of acrolein. Results are reported later in Table 2.

IE12: weigh another aliquot of the acrolein/DMF solution prepared in CE2 and weigh an amine of formula (I) into a 20 mL volume GC vial, crimp cap the vials to give a starting mixture that contains acrolein and the amine of formula (I). Then heat the crimp-capped vial in the GC instrument at 140° C. for 30 minutes, and then determine the amount of acrolein in the headspace of the vial using GC Method 1. Compare this amount of acrolein in the headspace to the starting amount of HATATA, in ppm. Compare the amount of acrolein in ppm to the first concentration of acrolein of CE2, expressed as a percentage. Results are reported below in Table 2.

TABLE 2

Acrolein Concentration Attenuation Test Results.

| Ex. No. | Starting amount of Acrolein solution (mg) | Amine of formula (I) | Starting amount of Amine of formula (I) (mg) | Amount of Acrolein (ppm relative to acrolein solution) | Concentration of Acrolein relative to First Concentration |
|---|---|---|---|---|---|
| CE2 | 204 | None | None | 4910 (first concentration) | 100% |
| IE12 | 206 | 1,6-Hexanediamine | 2.5 | 1.2 | 0.024% |

As shown by the data in Table 2, the starting mixture of acrolein and amine of formula (I) in IE12 shows significantly lower concentration of acrolein relative to concentration in the acrolein/DMF solution after heating. In contrast in CE2, the acrolein solution in DMF that is heated without an amine of formula (I) shows a significantly higher amount of acrolein relative to acrolein/DMF solution.

CE3: weigh TAIC into a 20 mL GC vial, crimp cap the vial to give a comparative starting mixture that does not contain acrolein and does not contain the amine of formula (I). Then heat the crimp-capped vial in the GC instrument at 140° C. for 30 minutes, and then determine the amount of acrolein in the headspace of the vial using GC Method 1. Compare the amount of acrolein in the headspace to the starting amount of TAIC, in ppm. Set this amount in ppm equal to the first concentration of acrolein. Results are reported later in Table 3.

IE13: weigh TAIC and an amine of formula (I) into separate 20 mL volume GC vial, crimp cap the vial to give a starting mixture that does not contain acrolein but does contain the amine of formula (I). Then preheat the crimp-capped vial in the GC instrument at 140° C. for 30 minutes, and then determine the amount of acrolein in the headspace of the vial using GC Method 1. Compare this amount of acrolein in the headspace to the starting amount of TAIC, in ppm. Compare the amount of acrolein in ppm to the first concentration of acrolein of CE3, expressed as a percentage. Results are reported below in Table 3.

TABLE 3

Acrolein Concentration Attenuation Test Results.

| Ex. No. | Starting amount of TAIC (mg) | Amine of formula (I) | Starting amount of Amine of formula (I) (mg) | Amount of Acrolein (ppm relative to HATATA) | Concentration of Acrolein relative to First Concentration |
|---|---|---|---|---|---|
| CE3 | 200 | None | 0 | 0.3 (first concentration) | 100% |
| IE13 | 208 | 1,6-Hexanediamine | 2.3 | <0.1 | <33% |

The data in Table 3 show the starting mixture of TAIC and amine of formula (I) in IE13 shows significantly lower concentration of acrolein after heating. In contrast in CE3, the TAIC that is heated without an amine of formula (I) shows a significantly higher amount of acrolein relative to TAIC (source of acrolein).

CE4: weigh LDPE 2, dicumyl peroxide (DCP), TAIC, and HATATA, and soak the DCP, TAIC, and HATATA into the LDPE 2 at 80° C. for 6 hours. Transfer the resulting soaked material into a GC bottle having a 500 mL volume headspace. Place the GC bottle and its contents in an oven set at 140° C. for 1 hour, then at room temp. for 1 hour, and then determine the amount of acrolein in the headspace of the vial using GC Method 1. Compare the amount of acrolein in the headspace to the starting amount of HATATA, in ppm. Set this amount in ppm equal to the first concentration of acrolein. Results are reported later in Table 4.

IE14 and IE15: weigh HATATA and 1,6-hexanediamine and combine together, and heat the combination at 50° C. for 2 minutes. Add the combination to weighed LDPE 2, dicumyl peroxide (DCP), and TAIC, and soak the DCP, TAIC, HATATA and 1,6-hexanediamine into the LDPE 2 at 80° C. for 6 hours. Transfer the resulting soaked material into a GC bottle having a 500 mL volume headspace. Place the GC bottle and its contents in an oven set at 140° C. for 1 hour, and then determine the amounts of acrolein in the headspaces of the vials using GC Method 1. Compare these amounts of acrolein in the headspaces to the starting amounts of HATATA, in ppm. Compare the amounts of acrolein in ppm to the first concentration of acrolein of CE4, expressed as a percentage. Results are reported below in Table 4.

TABLE 4

Acrolein Concentration Attenuation Test Results.

| Contents | CE4 | IE14 | IE15 |
|---|---|---|---|
| LDPE 2 (parts per 100) | 98.25 | 98.21 | 98.242 |
| DCP | 0.5 | 0.5 | 0.5 |
| TAIC | 0.45 | 0.45 | 0.45 |
| HATATA | 0.8 | 0.8 | 0.8 |
| 1,6-Hexanediamine | 0.00 | 0.04 | 0.008 |
| Total Parts | 100 | 100 | 100 |
| Amount of Acrolein (ppm relative to HATATA) | 12.8 (first concentration) | Not detected (ND) | Not detected |

TABLE 4-continued

Acrolein Concentration Attenuation Test Results.

| Contents | CE4 | IE14 | IE15 |
|---|---|---|---|
| Concentration of Acrolein relative to First Concentration | 100% | 0% or ND | 0% or ND |

The data in Table 4 show the LDPE compounded with DCP, TAIC, HATATA, and amine of formula (I) in IE14 and IE15 do not show any acrolein (is free of acrolein or acrolein is present but at a concentration below the limit of detection). In contrast in CE4, the LDPE that is compounded with DCP, TAIC, and HATATA, but not with an amine of formula (I), shows a significant amount of acrolein relative to HATATA (source of acrolein).

Incorporate by reference here the below claims as numbered aspects except replace "claim" and "claims" by "aspect" or "aspects," respectively.

The invention claimed is:

1. A method of producing a treated mixture that is free of acrolein or that has a lower concentration of acrolein than a comparative untreated mixture, the method comprising contacting a starting mixture with an effective amount of a monoamine of formula (I-1): $R^{1a}R^{2a}R^{3a}N$ (I-1) so as to produce a treated mixture;

wherein the starting mixture comprises a crosslinkable polymer composition comprising constituents (A1-1 ab), (C1) and (C2): (A1-1 ab) a crosslinkable thermoplastic, non-elastomer ethylene-based polymer; (C1) organic peroxide; (C2) compound containing an oxygen-bonded allyl group or nitrogen-bonded allyl group that is N,N,N',N',N",N"-hexaallyl-1,3,5-triazine-2,4,6-triamine or 1,3,5-triallyl-1,3,5-triazine-2,4,6-(1H,3H,5H)-trione;

wherein the contacting step further comprises heating, at a curing temperature, the crosslinkable polymer composition to give the treated mixture;

wherein the treated mixture comprises constituent (A2-1) a crosslinked ethylene-based polymer, which is a product of curing constituent (A1-1ab), and (E) a product of a reaction of the amine of formula (I) with acrolein; and wherein the treated mixture is free of acrolein or has a concentration of acrolein that is from >0 percent to less than 50% of the first concentration of (B) acrolein in the comparative untreated mixture when both of the treated and untreated mixtures are tested according to Acrolein Test Method 1; and wherein:

$R^{1a}$ is a monovalent $(C_1$-$C_{20})$aliphatic group, a monovalent $(C_1$-$C_{20})$oxaaliphatic group, a monovalent $(C_6$-$C_{14})$aryl group, or a monovalent $(C_2$-$C_{12})$heteroaryl group; and each of $R^{2a}$ and $R^{3a}$ is dependently H, a monovalent $(C_1$-$C_{20})$aliphatic group, or a monovalent $(C_1$-$C_{20})$oxaaliphatic group; or $R^{1a}$ and $R^{2a}$ are bonded together to give a divalent group of formula —$R^{1b}$—$R^{2b}$—, wherein the divalent group is a divalent $(C_2$-$C_{20})$aliphatic group, or a divalent $(C_1$-$C_{20})$oxaaliphatic group and Ria is H, a monovalent $(C_1$-$C_{20})$aliphatic group, or a monovalent $(C_1$-$C_{20})$oxaaliphatic group; or $R^{1a}$ and $R^{2a}$ and $R^{3a}$ are bonded together to give a trivalent group of formula —$R^{1a}$—$R^{2a}$—$R^{3a}$—, wherein the trivalent group is a trivalent $(C_3$-$C_{20})$aliphatic group, or a trivalent $(C_2$-$C_{20})$heteroaliphatic group;

wherein each aliphatic group, oxaaliphatic group, aryl group, and heteroaryl group is independently unsubstituted or substituted with 1 to 5 substituents independently selected from a halogen atom, oxo (i.e., =O), or —OR, wherein each R is independently H, an unsubstituted $(C_1$-$C_{20})$hydrocarbyl group or an unsubstituted $(C_1$-$C_{20})$oxahydrocarbyl group; and wherein each oxaaliphatic group and oxahydrocarbyl group independently contains from 1 to 4 oxygen atoms;

with the proviso that the monoamine of formula (I-1) is free of —SH; a silicon atom; a 1,2-dihydroquinolinyl; a nitrogen-bonded atom selected from N, O, and S; and a nitrogen-bonded group selected from allyl, a carbamoyl group, and an oxymethylene group.

2. The method of claim 1 wherein the organic peroxide is dicumyl peroxide.

3. The method of claim 1 wherein:

each of $R^{2a}$ and $R^{3a}$ is H and $R^{1a}$ is an unsubstituted $(C_1$-$C_{20})$alkyl; or each $R^{2a}$ and $R^{3a}$ is H and $R^{1a}$ is a substituted $(C_1$-$C_{20})$alkyl having 1 substituent selected from —OR, or a substituted $(C_1$-$C_{20})$oxaaliphatic group having 1 substituent selected from —OR, wherein each R is independently H; or each $R^{2a}$ and $R^{3a}$ H and $R^{1a}$ is a substituted $(C_1$-$C_{20})$alkyl having 1 substituent selected from phenyl; or each $R^{2a}$ and $R^{3a}$ is H and $R^{1a}$ is an unsubstituted monovalent $(C_6$-$C_{14})$aryl group; or $R^{3a}$ is H and $R^{1a}$ and $R^{2a}$ are bonded together to give a divalent group of formula —$R^{1b}$—$R^{2b}$—, wherein the divalent group is an unsubstituted divalent $(C_2$-$C_{20})$ aliphatic group; or each of $R^{1a}$, $R^{2a}$ and $R^{3a}$ is an unsubstituted $(C_1$-$C_{20})$alkyl group.

4. A treated mixture produced by the method of claim 1.

5. A manufactured article comprising (A2-1) a crosslinked ethylene-based polymer formed by curing the constituent (A1-1ab) using an embodiment of the method of claim 1.

* * * * *